(12) United States Patent
Kakou et al.

(10) Patent No.: US 7,414,647 B2
(45) Date of Patent: Aug. 19, 2008

(54) WIDE VIEW FIELD AREA CAMERA APPARATUS AND MONITORING SYSTEM

(75) Inventors: Noritoshi Kakou, Nara (JP); Masahiro Misawa, Hyogo (JP)

(73) Assignee: Sharp Kabushiki Kaisha, Osaka (JP)

(*) Notice: Subject to any disclaimer, the term of this patent is extended or adjusted under 35 U.S.C. 154(b) by 708 days.

(21) Appl. No.: 10/372,053

(22) Filed: Feb. 20, 2003

(65) Prior Publication Data
US 2003/0180039 A1  Sep. 25, 2003

(30) Foreign Application Priority Data
Feb. 21, 2002  (JP) .............................. 2002-045479

(51) Int. Cl.
*H04N 7/18* (2006.01)
*H04N 9/47* (2006.01)
*H04N 5/238* (2006.01)

(52) U.S. Cl. .................... 348/143; 348/150; 348/369

(58) Field of Classification Search ............... 348/36, 348/150, 170–172, 369; 359/727, 729
See application file for complete search history.

(56) References Cited

U.S. PATENT DOCUMENTS

| | | | |
|---|---|---|---|
| 5,111,288 A * | 5/1992 | Blackshear | 348/143 |
| 5,517,236 A * | 5/1996 | Sergeant et al. | 348/143 |
| 5,790,181 A * | 8/1998 | Chahl et al. | 348/36 |
| 6,019,524 A * | 2/2000 | Arbuckle | 396/427 |
| 6,130,783 A * | 10/2000 | Yagi et al. | 359/627 |
| 6,157,018 A * | 12/2000 | Ishiguro et al. | 250/208.1 |
| 6,226,035 B1 * | 5/2001 | Korein et al. | 348/335 |
| 6,375,366 B1 * | 4/2002 | Kato et al. | 396/351 |
| 6,693,518 B2 | 2/2004 | Kumata et al. | |
| 6,704,148 B2 * | 3/2004 | Kumata | 359/725 |
| 2003/0071891 A1 * | 4/2003 | Geng | 348/39 |

FOREIGN PATENT DOCUMENTS

| | | |
|---|---|---|
| JP | 09-118178 | 5/1997 |
| JP | 10-322684 | 12/1998 |
| JP | 2000-131738 | 5/2000 |
| JP | 2000-206635 | 7/2000 |
| JP | 2000-350067 | 12/2000 |
| JP | 2001-189882 | 7/2001 |
| JP | 2001-257914 | 9/2001 |
| JP | 2001-331789 | 11/2001 |
| WO | WO 01/76233 A1 | 10/2001 |

OTHER PUBLICATIONS

European Patent Office Communication dated Jun. 5, 2003 (4 pp.) for corresponding application No. 03251035.6-2202.
European Search Report dated Oct. 24, 2003 (5 pp.) for corresponding application No. 03251035.6-2202.

* cited by examiner

*Primary Examiner*—James M. Hannett
*Assistant Examiner*—Kelly L Jerabek
(74) *Attorney, Agent, or Firm*—David G. Conlin; David A. Tucker; Edwards Angell Palmer & Dodge LLP

(57) ABSTRACT

A camera apparatus of the present invention comprises: an optical system for projecting image light representing an image of a wide view field area toward a prescribed direction; an imaging section for obtaining, as an image, the image light projected by the optical system; and a holding member for integrally holding the optical system and the imaging section in a state where the curved mirror and the imaging section are opposed to each other.

32 Claims, 9 Drawing Sheets

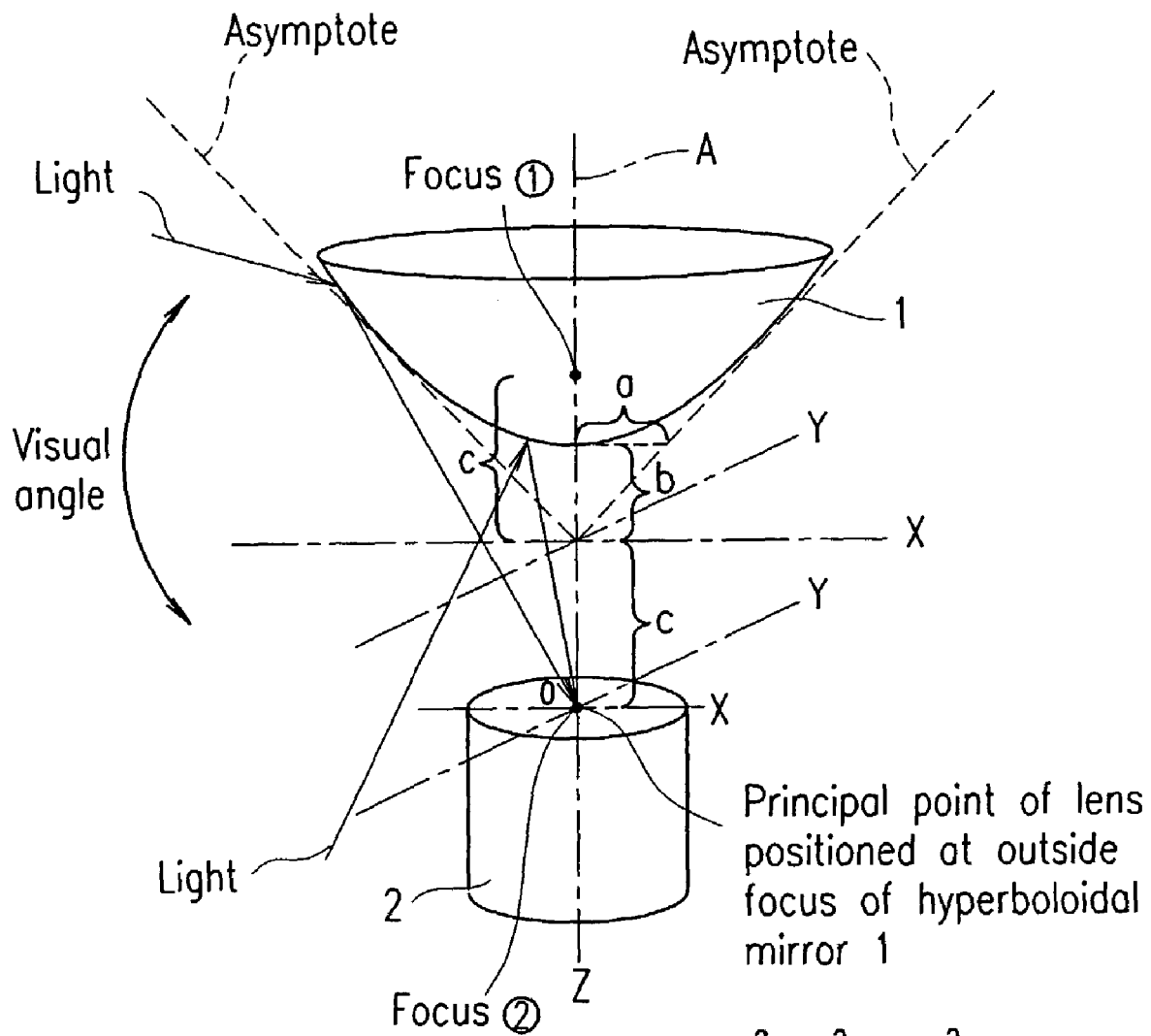

WIDE VIEW FIELD AREA CAMERA APPARATUS AND MONITORING SYSTEM

BACKGROUND OF THE INVENTION

1. Field of the Invention

The present invention relates to a camera apparatus and a monitoring system, and more particularly to a camera apparatus, which includes a curved mirror reflecting image light representing an image of a wide view field area toward a prescribed direction and an imaging section for obtaining, as an image, the image light reflected by the curved mirror, capable of obtaining an image of a wide view field area and a system including the same camera apparatus.

2. Description of the Related Art

In many cases, automated teller machines (ATM) for automatically paying/receiving money are installed in a relatively small area within a bank or the like, where money is handled, and therefore there is a high possibility that a criminal activity such as larceny might occur. Accordingly, a place where an ATM is installed is required to be monitored at all times using a monitoring camera.

When monitoring an ATM, it is necessary to monitor the operator and an operation panel of the ATM, i.e., the general vicinity of the ATM must be targeted for monitoring. However, in many cases, ATMs are installed in a relatively small area, and therefore a target for monitoring cannot be sufficiently distanced from the location where a monitoring camera is installed. Therefore, there is a possibility that a view field area for an image obtained by the monitoring camera might be limited. In particular, a monitoring camera using an industrial television (ITV) camera has a problem that an angle α of view which enables monitoring is predetermined by an optical system of the monitoring camera, and therefore part of the target for monitoring is located out of an area defined by the angle of view, i.e., the target for monitoring is partially located in a blind area.

FIG. 9 is a side view showing an area monitored by a monitoring camera using an ITV camera normally used for monitoring an ATM which is installed on a wall above the ATM.

In the example shown in FIG. 9, the monitoring camera is installed such that the operator of the ATM is positioned within the area defined by the angle α of view of the monitoring camera. In this case, an entire image of the ATM operator can be obtained, while there is a blind area represented by angle β in directions in the vicinity of a direction vertically downward from the monitoring camera. Such a blind area cannot be monitored, i.e., an operation panel of the ATM cannot be monitored.

On the other hand, although not shown in the figures, when an installation angle of the monitoring camera is adjusted so as to monitor the operation panel of the ATM, it is not possible to obtain an image of a sufficiently widely ranging area for monitoring the ATM operator.

In the case of monitoring circumstances in a wide range of area around an ATM or the like using a conventional ITV camera, it is conceivable that a monitoring system, which includes a turntable for turning the ITV camera and a driving device or the like for pivotably driving the turntable, is provided so as to allow the ITV camera to be turned pivotably, thereby reducing the blind area created when the ITV camera is used. However, in such a case, it is necessary to provide, in addition to the ITV camera, the turntable for turning the ITV camera and the driving device or the like for pivotably driving the turntable, and therefore the configuration of the monitoring system becomes complicated.

Alternatively, instead of providing the turntable, the driving device, etc., it is conceivable that a wide-angle lens is used to widen a field view area of the ITV camera. However, in such a case, there is a problem in that a large wide-angle lens causes the ITV camera to be increased in size. Further, the ITV camera becomes expensive by the cost of the wide-angle lens.

As an example of a camera apparatus which overcomes the above problems caused by using the conventional ITV camera, there is a vehicle surroundings monitoring apparatus described in Japanese Laid-Open Patent Publication No. 9-118178. This vehicle surroundings monitoring apparatus is applied to a vehicle surroundings recognizing system used for appreciating a positional relationship between a car and an object therearound.

The vehicle surroundings monitoring apparatus described in the above publication includes a wide-angle camera mounted at a left rear end portion of the vehicle and a monitor installed in the vehicle for displaying a view obtained as an image by the wide-angle camera on the screen. The wide-angle camera includes a convex mirror capable of reflecting an omnidirectional view around the vehicle, an imaging device for obtaining a virtual image reflected by the convex mirror, and a transparent pipe for connecting the convex mirror with the imaging device. In the vehicle surroundings monitoring apparatus described in the above publication, the imaging device obtains an omnidirectional virtual image reflected by the convex mirror and a synthetic image is created based on the image obtained by the imaging device so as to allow a positional relationship between the vehicle and an object located therearound, the shape of the vehicle, etc., to be readily appreciated. The synthetic image is displayed on the monitor installed in the vehicle. With such a simple configuration, the vehicle surroundings monitoring apparatus allows easy appreciation of omnidirectional positional relationships around the vehicle.

Further, Japanese Laid-Open Patent Publication No. 2000-206635 discloses a panoramic imaging apparatus including a hyperboloidal convex mirror for reflecting a 360° image, a lens placed so as to be opposed to a reflection surface of the hyperboloidal convex mirror, a camera apparatus for obtaining an annular image reflected by the hyperboloidal convex mirror, and a computer for transforming the annular image obtained by the camera apparatus into a planar image based on a specific viewing angle. With such a simple configuration as to use the computer for transforming the annular image reflected by the hyperboloidal convex mirror into a panoramic image, the panoramic imaging apparatus obtains a panoramic image of a 360° view field area.

In the case of installing a conventional ITV camera in a manner as shown in FIG. 9, it is necessary to confirm whether or not a certain area is appropriately obtained as an image during installation. Specifically, it is necessary to adjust an installation angle, etc., of the ITV camera while viewing an image displayed on a monitor during the installation of the ITV camera, and this is a complicated and time-consuming task.

As in the case described in conjunction with FIG. 9, when using a camera apparatus disclosed in either Japanese Laid-Open Patent Publication No. 9-118178 or 2000-206635 for monitoring a particularly small area in a bank or the like where an ATM or the like is installed, even if the camera apparatus can obtain an image of a wide view field area in a lateral direction, an area in a direction vertically downward from the camera apparatus cannot be obtained as an image since an image of an imaging section of the camera apparatus itself is reflected in a convex mirror of the camera apparatus.

Further, in such a camera apparatus, a device required for controlling an image obtaining operation, e.g., an interface section for transferring an image to an external device, needs to be provided in the vicinity of an imaging device. This increases the size of the imaging section, and thus an area located in a direction vertically downward from the camera apparatus, where obtaining an image is not possible, is also increased. As a matter of course, the device is restricted in its design.

Furthermore, in the vehicle surroundings monitoring apparatus described in Japanese Laid-Open Patent Publication No. 9-118178, the transparent pipe is used for connecting the convex mirror with the imaging device, and in the case of using such a transparent pipe for connecting the convex mirror with the imaging device, when incident light entering into the transparent pipe is transmitted therethrough, internal reflection occurs in the transparent pipe. The internally reflected light reaches the imaging device so that light other than that essentially required is incident on the imaging device. As a result, an image including a plurality of overlapping views is generated.

Further still, the panoramic imaging apparatus described in Japanese Laid-Open Patent Publication No. 2000-206635 does not have a mechanism for maintaining the camera in the state of being opposed to a reflecting surface of the hyperboloidal convex mirror. However, the panoramic imaging apparatus described in this publication is configured to obtain an image by collecting light reflected by the hyperboloidal convex mirror. Although a positional relationship between the hyperboloidal convex mirror and the camera is important in order to obtain a clear and high resolution image, it is difficult to separately install the hyperboloidal convex mirror and the camera in a place where an image obtaining operation is performed, such that the positional relationship between the hyperboloidal convex mirror and the camera is adjusted so as to bring the camera into focus. Moreover, since the panoramic imaging apparatus is intended to obtain an image of a 360° view field area using the hyperboloidal convex mirror, it is appreciated that the panoramic imaging apparatus also uses a transparent pipe so as to hold the hyperboloidal convex mirror and the camera as in a similar manner to the vehicle surroundings monitoring apparatus described in the aforementioned Japanese Laid-Open Patent Publication No. 9-118178. In such a case, as described above with respect to the vehicle surroundings monitoring apparatus described in Japanese Laid-Open Patent Publication No. 9-118178, internal reflection occurs in the transparent pipe and the internally reflected light reaches the imaging device so that light other than that essentially required is incident on the imaging device. As a result, an image including a plurality of overlapping views is generated.

SUMMARY OF THE INVENTION

According to one aspect of the present invention, there is provided a camera apparatus including: an optical system for projecting image light representing an image of a wide view field area toward a prescribed direction; an imaging section for obtaining, as an image, the image light projected by the optical system; and a holding member for integrally holding the optical system and the imaging section in a state where the curved mirror and the imaging section are opposed to each other.

In one embodiment of the invention, the optical system is a curved mirror or a fish-eye lens.

In another embodiment of the invention, the holding member is configured so as to be attachable while holding the curved mirror and the imaging section such that central optical axes of the curved mirror and the imaging section are inclined at a prescribed angle with respect to a vertical direction.

In still another embodiment of the invention, the holding member includes a curved mirror support portion for supporting the curved mirror, an imaging section support portion for supporting the imaging section, which is provided so as to be opposed to the curved mirror support portion, and a connecting portion for connecting the curved mirror support portion with the imaging section support portion, which is provided in the holding member at a side of an area which is not targeted for imaging by the curved mirror.

In still another embodiment of the invention, the holding member holds the curved mirror and the imaging section so as to be opposed to each other such that their respective axial directions are identical.

In still another embodiment of the invention, the curved mirror is a mirror having a shape of a body of rotation.

In still another embodiment of the invention, the holding member includes the curved mirror support portion, the imaging section support portion, and the connecting portion so as to have a U-like shape when viewed from a lateral direction.

In still another embodiment of the invention, the holding member is attached to a wall surface of a construction such that a central optical axis of the imaging section is inclined at a prescribed angle with respect to the wall surface of the construction such that the holding member has a gap which is open upwards.

In still another embodiment of the invention, the holding member is attached to a ceiling surface of the construction such that the central optical axis of the imaging section is inclined at a prescribed angle with respect to the ceiling surface of the construction such that the holding member has a gap which is open upwards.

In still another embodiment of the invention, the camera apparatus further includes an attaching member for attaching the holding member to the wall surface of the construction.

In still another embodiment of the invention, the camera apparatus further includes an attaching member for attaching the holding member to the ceiling surface of the construction.

In still another embodiment of the invention, the mirror having a shape of a body of rotation is provided in the form of a convex or concave paraboloid or hyperboloid.

In still another embodiment of the invention, the imaging section includes an adjusting member for adjusting a distance between a specular surface of the curved mirror and a lens included in the imaging section.

In still another embodiment of the invention, the holding member includes a fixing member for removably fixing each of the curved mirror and the imaging section.

In still another embodiment of the invention, the connecting portion of the holding member has a reflected light absorber formed thereon, the reflected light absorber absorbing light reflected by portions of the holding member.

In still another embodiment of the invention, the camera apparatus further includes a transparent cover attached to an end of each of the curved mirror support portion and the imaging section support portion, which are included in the holding member, so as to cover the curved mirror and the imaging section which are placed inside the holding member.

In still another embodiment of the invention, the camera apparatus further includes a transparent cover attached to an end of each of the curved mirror support portion and the imaging section support portion, which are included in the holding member, so as to cover the curved mirror and the imaging section which are placed inside the holding member.

In still another embodiment of the invention, the camera apparatus further includes an imaging control section for controlling the imaging section at a side of an area which is not targeted for imaging by the imaging section.

In still another embodiment of the invention, the imaging control section is provided in the vicinity of the connecting portion of the holding member.

According to another aspect of the present invention, there is provided a monitoring system including: a camera apparatus of the first aspect of the present invention; an image data storing section for sequentially updating and storing image data obtained by the imaging section in units of frames; a transformation information storing section for storing transformation information for use in transforming image data in a predetermined display form; an image data transforming section for transforming image data obtained as input image data by the camera apparatus into transformed image data in the form of panoramic image data or perspective image data based on the transformation information; a display section for displaying the transformed image data; and a display control section for controlling displaying of image data on the display section.

In one embodiment of the invention, the monitoring system further includes a display range designating section for designating a display range of the image data, wherein a portion of the image data, which corresponds to the display range designated by the display range designating section is displayed on the display section in an enlarged or reduced manner under the control of the display control section.

In another embodiment of the invention, the monitoring system further comprising a mobile body detecting section for comparing image data successively updated and stored in the image data storing section in units of frames so as to detect a mobile body approaching a region corresponding to the display range designated by the display range designating section, wherein image data including an image of the detected mobile body is displayed on the display section in an enlarged or reduced manner under the control of the display control section.

In still another embodiment of the invention, the monitoring system further includes a communication section for communicating with an external terminal device provided outside the monitoring system so as to transmit a variety types of information to the external terminal device, wherein the communication section transmits image data including an image of a mobile body detected by the mobile body detecting section to the external terminal device.

Thus, the invention described herein makes possible the advantage of providing: (1) a camera apparatus configured in a simple and fixed manner so as to reduce a blind area created within a widely ranging image area and, in particular, a blind area in the vicinity of a direction vertically downward from the camera apparatus, when monitoring a small place, while simplifying adjustments during installation; and (2) a monitoring system including the same camera apparatus.

This and other advantages of the present invention will become apparent to those skilled in the art upon reading and understanding the following detailed description with reference to the accompanying figures.

BRIEF DESCRIPTION OF THE DRAWINGS

FIG. 2A is a side view of the camera apparatus viewed from a direction along a wall surface on which the camera apparatus is installed; FIG. 2B is a side view of the camera apparatus viewed from a direction perpendicular to the wall surface on which the camera apparatus is installed; and FIG. 2C is an elevation view of the camera apparatus viewed from a direction along the central optical axis thereof.

FIG. 3 is a schematic diagram showing a positional relationship between a hyperboloidal mirror used as a rotation body mirror according to an embodiment of the present invention and an imaging section placed so as to be opposed to the hyperboloidal mirror.

FIG. 4A is a side view of the camera apparatus viewed from a direction along a wall surface on which the camera apparatus is installed; FIG. 4B is a side view of the camera apparatus viewed from a direction perpendicular to the wall surface on which the camera apparatus is installed; and FIG. 4C is an elevation view of the camera apparatus viewed from a direction along the central optical axis thereof.

DESCRIPTION OF THE PREFERRED EMBODIMENTS

Hereinafter, embodiments of the present invention will be described with respect to a camera apparatus and with reference to the accompanying drawings.

Figure 1:
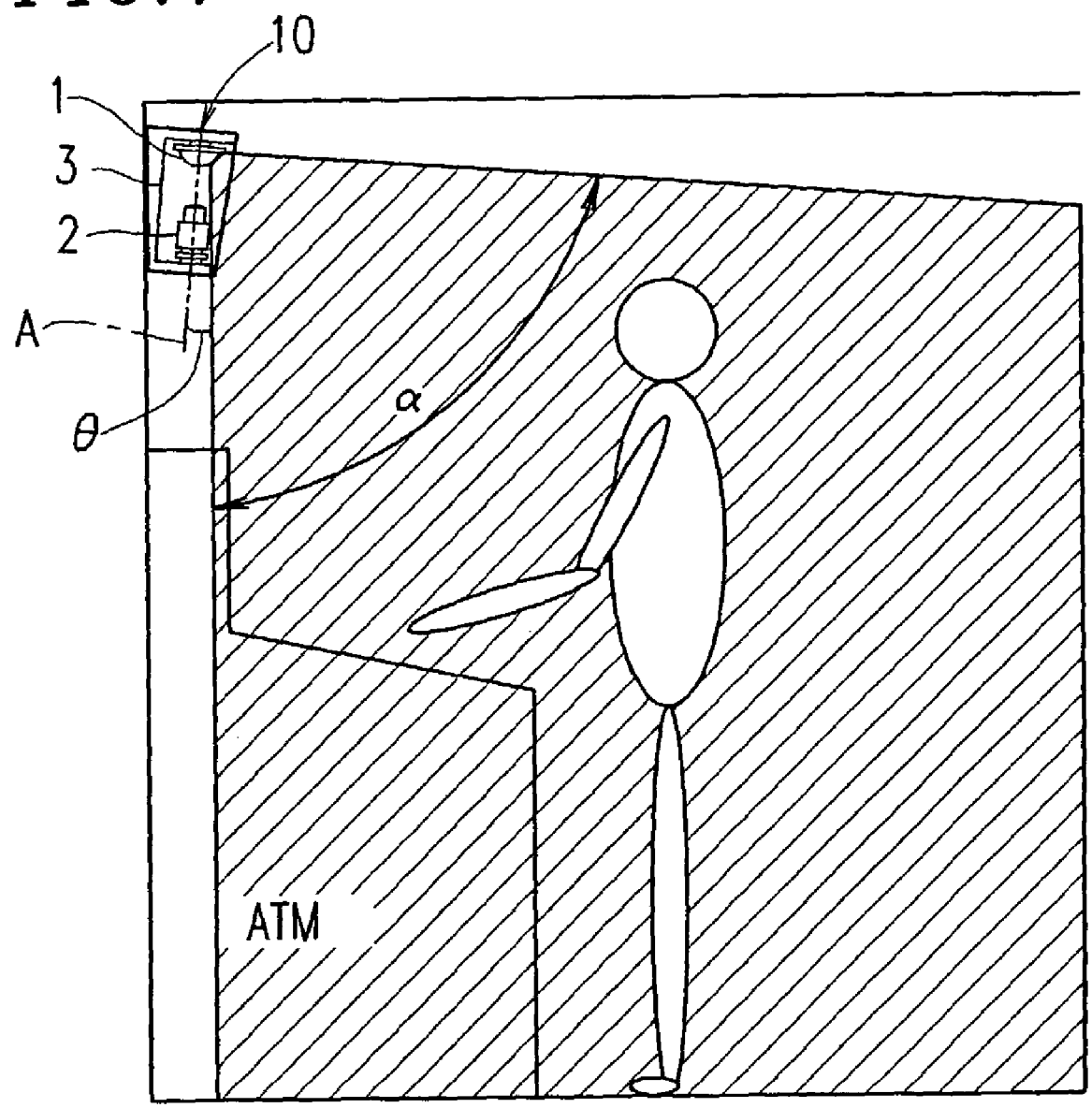
FIG. 1 is a side view showing an example where a camera apparatus according to the present invention is installed on a wall above an ATM installed in a closed area within a bank or the like so as to monitor the place where the ATM is installed.

FIG. 1 is a side view showing an example where a camera apparatus 10 according to the present invention is installed on a wall above an ATM installed in a closed area within a bank or the like so as to monitor the place where the ATM is installed.

As shown in FIG. 1, the camera apparatus 10 according to the present invention includes a mirror (a curved mirror) 1 having a shape of a body of rotation (hereinafter, referred to as the "rotation body mirror 1") for projecting image light representing an image of a widely ranging area toward a prescribed direction and an imaging section 2 for obtaining, as an image, the image light projected by the rotation body mirror 1. The rotation body mirror 1 and the imaging section 2 are held by a holding member 3 having a box-like structure in which three side surfaces are open, such that a rotation axis of the rotation body mirror 1 is identical with optical axis A of the imaging section 2.

Further, the camera apparatus 10 is held such that optical axis A of the imaging section 2 makes a prescribed angle θ with respect to a vertical direction when the camera apparatus 10 is installed as shown in FIG. 1.

The camera apparatus 10 according to the present invention is installed on an upper portion of a wall surface or a ceiling in a closed area. The camera apparatus 10 is intended to obtain an image of an area ranging from a direction vertically downward from the camera apparatus 10 to a forward direction in the closed area for the purpose of monitoring but is not intended to obtain an image of the wall or ceiling on which the camera apparatus 10 is installed or which is located immediately close to the rotation body mirror 1. Accordingly, the holding member 3 for holding the rotation body mirror 1 and the imaging section 2 is configured to be open at the front side to an area targeted for monitoring and have a connecting portion (which is not shown in FIG. 1 and will be described later in conjunction with FIG. 2A), which supports the rotation body mirror 1 and the imaging section 2 so as to be suitably distanced from each other, at the side of the holding member 3 proximate to the wall surface which is not targeted for monitoring.

Unlike the camera apparatus described in Japanese Laid-Open Patent Publication No. 9-118178, the camera apparatus 10 according to the present invention does not have a transparent pipe for connecting the rotation body mirror 1 with the imaging section 2, and therefore an image obtained by the camera apparatus 10 does not include a plurality of overlapping views due to incident light which enters into the transparent pipe and reaches the imaging section.

Further, the camera apparatus 10 according to the present invention is configured such that rotation axis A of the rotation body mirror 1 and optical axis A of the imaging section 2 are inclined at a prescribed angle with respect to a vertical direction. This configuration allows the camera apparatus 10 to obtain an image of an area ranging from a direction vertically downward from the camera apparatus 10 to a forward direction in the closed area where the camera apparatus 10 is installed, i.e., an entire area ahead of the position at which the ATM or the like is installed.

Therefore, although the camera apparatus 10 according to the present invention is configured in a simple manner, it is possible to hold the rotation body mirror 1 and the imaging section 2 in a fixed manner and reduce a blind area created within the widely ranging image area and, in particular, a blind area in a direction downward from the camera device 10, when monitoring a closed area.

Further, an image of substantially the entire area in front of the camera apparatus 10 can be obtained, and therefore by simply installing the camera apparatus 10 on a wall or ceiling surface, the entire area desired to be monitored can be obtained as an image. As a result, it is possible to eliminate adjustments of an installation angle at which the camera apparatus 10 is installed.

The camera apparatus 10 according to the present invention will now be described in further detail with reference to the drawings.

Figure 2A:
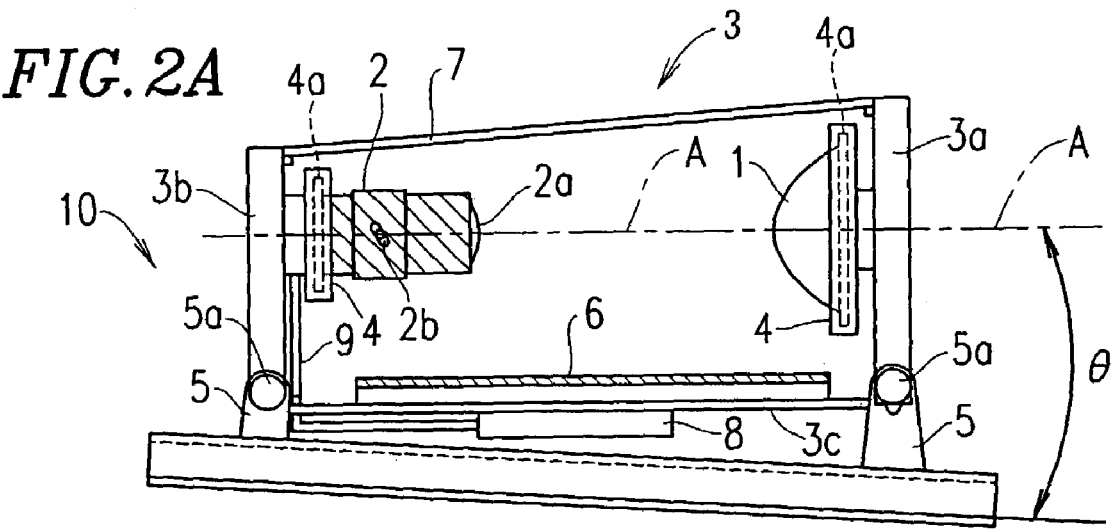
FIGS. 2A-2C are views each schematically illustrating the same camera apparatus according to the present invention.
Figure 2B:
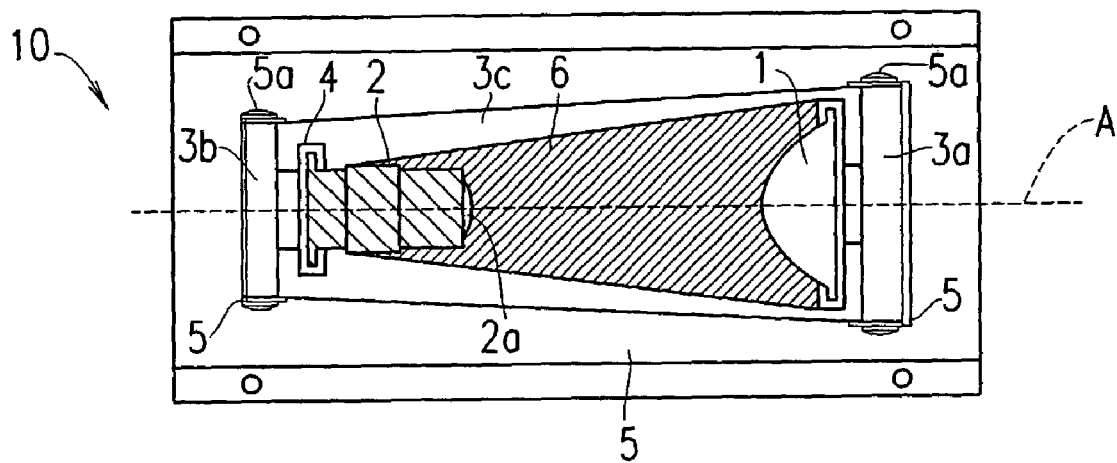
Figure 2C:
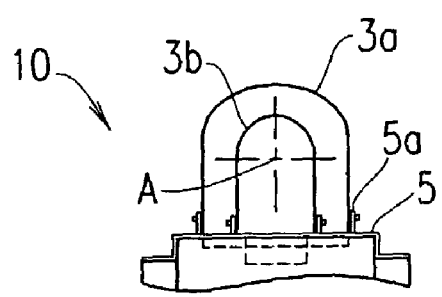

FIGS. 2A-2C are views each schematically illustrating the camera apparatus 10 according to the present invention: FIG. 2A is a side view of the camera apparatus 10 viewed from a direction along a wall surface on which the camera apparatus 10 is installed; FIG. 2B is a side view of the camera apparatus 10 viewed from a direction perpendicular to the wall surface on which the camera apparatus 10 is installed; and FIG. 2C is an elevation view of the camera apparatus 10 viewed from a direction along the central optical axis thereof.

As shown in FIGS. 2A-2C and as described above, the camera apparatus 10 according to the present invention includes the rotation body mirror (curved mirror) 1 for projecting image light representing an image of a widely ranging area and the imaging section 2 for obtaining, as an image, the image light projected by the rotation body mirror 1. The rotation body mirror 1 and the imaging section 2 are integrally held by the holding member 3 such that rotation axis A of the rotation body mirror 1 is identical with optical axis A of the imaging section 2 and the rotation body mirror 1 is opposed to the imaging section 2 so as to be spaced from each other at a prescribed distance.

The rotation body mirror 1 is formed of a satisfactorily refractory resin material (e.g., acrylic resin) which is provided in the form of a convex or concave paraboloid or hyperboloid having an up to 360° omnidirectional view field therearound. Aluminum or the like is deposited on surfaces of the resin material and the aluminum-deposited surfaces are processed so as to be specular.

Although the present embodiment is described with respect to the case where the rotation body mirror 1 is in the form of a complete convex hyperboloid, the present invention is not limited to this. The rotation body mirror 1 can be formed so as to partially include a convex or concave parabolic or hyperbolic portion.

The imaging section 2 includes, for example, an imaging lens 2a, a CCD (not shown), an A/D converter (not shown), an image processing circuit (not shown), etc. The imaging section 2 uses the CCD to capture an optical image obtained by collecting, via the imaging lens 2a, light reflected by the specular surface of the rotation body mirror 1, and uses the A/D converter and the image processing circuit so as to create image data.

FIG. 3 is a schematic diagram showing a positional relationship between a hyperboloidal mirror used as the rotation body mirror 1 according to the present embodiment (hereinafter, also referred to as the "hyperboloidal mirror 1") and the imaging section 2 placed so as to be opposed to the hyperboloidal mirror 1.

The hyperboloidal mirror used as the rotation body mirror 1 and shown in FIG. 3 is one of two sheets of a two-sheeted hyperboloid obtained by rotating hyperbolic curves, which has a Z-axis as a central axis, around the Z-axis in a three-dimensional space where X- and Y-axes are perpendicular to each other and the Z-axis is perpendicular to the X- and Y-axes, i.e., the hyperboloidal mirror corresponds to a region of the two-sheeted hyperboloid where Z>0. This two-sheeted hyperboloid is represented as:

$$(X^2+Y^2)/a^2 - Z^2/b^2 = -1, \text{ and}$$

$$c^2 = (a^2+b^2),$$

where a and b are constants determined based on the shape of the hyperboloid of the hyperboloidal mirror, and c is a constant for defining a focus of the hyperboloid. The above expressions and constants associated therewith are prestored in a transformation information storing section 14 which will be described later.

The hyperboloidal mirror has two focuses ① and ② located at distance c away from point O of origin in different positions on the Z-axis. All light from outside which travels toward one of these focuses (in this case, focus ①) is reflected by the hyperboloidal mirror so as to reach the other focus (in this case, focus ②).

A light-receiving surface of the imaging lens 2a of the imaging section 2 is arranged such that rotation axis A (the Z-axis) of the rotation body mirror 1 (the hyperboloidal mirror) is identical with optical axis A of the imaging lens 2a, and the first principal point of the imaging lens 2a is located at focus ②. With such a configuration, an image obtained by the imaging section 2 for obtaining an image based on light reflected by the convex rotation body mirror 1 (the hyperboloidal mirror) corresponds to an image which is always seen from focus ① of the hyperboloidal mirror 1 regardless of a viewing direction.

An angle of view of the camera apparatus 10 is determined according to the shape of the hyperboloidal mirror 1 and design conditions of the imaging lens 2a, such that it is possible to obtain an image of a wide view field area at a close distance.

Referring to FIGS. 2A-2C, the holding member 3 includes: a rotation body mirror support portion 3a for supporting the rotation body mirror 1; an imaging section support portion 3b for supporting the imaging section 2; and a connecting portion 3c for integrally holding the rotation body mirror 1 and the imaging section 2 so as to be distanced from each other such that the camera apparatus 10 is brought into focus and the rotation body mirror 1 and the imaging section 2 have a positional relationship so as to have an identical axial direction. These elements 3a, 3b, and 3c are made of, for example, die-cast aluminum, rigid plastic, or the like, and integrally formed together so as to have a U-like shape when viewed from a lateral direction.

A fixing member 4 is provided on each of the bottom surface of the rotation body mirror support portion 3a and the upper surface of the imaging section support portion 3b such that the rotation body mirror 1 and the imaging section 2 are opposed to each other and the central optical axes A of the specular surface of the rotation body mirror 1 and the imaging lens 2a of the imaging section 2 are identical with each other. Similar to the holding member 3, the fixing members 4 are made of, for example, die-cast aluminum, rigid plastic, or the like. The fixing members 4 may be fixed to or integrally formed with the holding member 3.

Although the present embodiment is described with respect to the case where the fixing members 4 are provided such that the central optical axes A of the specular surface of the rotation body mirror 1 and a lens 2a of the imaging section 2 are identical with each other, their respective optical axes A can be deviated from each other depending on the purpose of application of image data.

An attaching member 5 for attaching the camera apparatus 10 on a wall surface or the like is connected at an end proximate to a connecting portion 3c of each of the rotation body mirror support portion 3a and the imaging section support portion 3b which are included in the holding member 3. The attaching member 5 includes arm portions extending along a direction perpendicular to a wall surface on which the attaching member 5 is fixed. Each arm portion includes a screw portion 5a provided at an end portion thereof. Each of the rotation body mirror support portion 3a and the imaging section support portion 3b which are included in the holding member 3 is attached to the attaching member 5 by means of the screw portion 5a. For example, as shown in FIG. 2A, the arm portions of the attaching member 5 are provided such that central optical axis A makes a prescribed angle with respect to a vertical direction when the camera apparatus 10 is installed. In this case, the arm portions of the attaching member 5 have different lengths such that arm portions at the upper side of the attaching member 5, which are attached to the rotation body mirror support portion 3a, are slightly longer than arm portions at the lower side of the attaching member 5 which are attached to the imaging section support portion 3b. In the state where the holding member 3 is attached to, for example, a wall or ceiling surface, or the like, by means of the attaching member 5, central optical axis A is inclined at a prescribed angle θ with respect to the wall or ceiling surface such that the holding member 3 has a gap which is open upwards. With this structure, it is possible to prevent the imaging section 2 from being positioned in a direction vertically below the rotation body mirror 1, thereby reducing a blind area created in a direction vertically downward from the camera apparatus 10 and preventing an image of the imaging section 2 itself from being captured.

The imaging section 2 includes an adjusting member 2b for adjusting a distance between the specular surface of the rotation body mirror 1 and the lens 2a of the imaging section 2 such that a focus of the rotation body mirror 1 is located on an image plane of the imaging section 2, i.e., a principal point of the imaging lens 2a is located at the focus of the rotation body mirror 1. Although not shown in the figures, the adjusting member 2b includes, for example, a pin, a locking screw, and a spiral guiding groove for moving the lens 2a straight along the central optical axis of the imaging portion 2.

Each of the fixing members 4 for fixing the rotation body mirror 1 or the imaging section 2 includes a slide guiding groove 4a for removably sliding and fixing the rotation body mirror 1 or the imaging section 2 such that rotation axis A of the rotation body mirror 1 is identical with central optical axis A of the lens 2a of the imaging section 2. Moreover, each of the rotation body mirror 1 and the imaging section 2 includes a flange portion engaging with the slide guiding groove 4a.

By sliding the flange portions of the rotation body mirror 1 and the imaging section 2 through their respective slide guiding grooves 4a, the rotation body mirror 1 and the imaging section 2 can be readily removed from/attached to the fixing member 4 and rotation axis A of the rotation body mirror 1 and central optical axis A of the imaging section 2 can be aligned with each other. Therefore, troublesome adjustments are not required for alignment of the central optical axis.

Further, a reflected light absorber 6, which is formed by a metal or resin plate to which a lusterless black paint is applied, is attached to the connecting portion 3c at the internal side of the holding member 3. The reflected light absorber 6 absorbs light reflected from portions of the holding member 3 and prevents generation of light indirectly incident on the rotation body mirror 1. Therefore, the imaging section 2 can obtain an image with a quantity of light essentially required.

Note that the reflected light absorber 6 and the connecting portion 3c may be integrally formed together, i.e., the connecting portion 3c may be painted so as to absorb reflected light.

A transparent cover 7 made of a transparent material, such as acrylic resin, is attached to an end of each of the rotation body mirror support portion 3a and the imaging section support portion 3b, which are included in the holding member 3, so as to prevent dust or the like from adhering to the rotation body mirror 1 and the imaging section 2 which are placed inside the holding member 3.

Since the reflected light absorber 6 is provided on the connecting portion 3c at the internal side of the holding member 3, even when such a transparent cover 7 is provided, it is possible to prevent the imaging section 2 from generating an image including a plurality of overlapping views due to light reflected by the transparent cover 7, i.e., the imaging section 2 can obtain an image with a quantity of light essentially required.

Note that the transparent cover 7 is not necessarily included in a basic configuration of the camera apparatus 10 according to the present invention. Therefore, it is not necessary to always provide the transparent cover 7.

Furthermore, an imaging control section 8 is provided on a back face of the connecting portion 3c of the holding member 3 which is out of the area covered by an image obtained by the camera apparatus 10. The imaging control section 8 functions as an interface for connecting the camera apparatus 10 to a monitoring system provided outside the camera apparatus 10. The imaging control section 8 and the imaging section 2 are electrically connected together via a cable 9 laid along surfaces of the imaging section support portion 3*b* and the connecting portion 3*c* which are included in the holding member 3.

Since the camera apparatus 10 according to the present embodiment is configured in the above-described manner, the size of the camera apparatus 10 itself is not increased. Further, the imaging control section 8 is positioned on the back face of the connecting portion 3*c* of the retaining member 3, which is out of the area covered by an image obtained by the camera apparatus 10, and therefore the size of the imaging section 2 can be reduced so that the area covered by an image obtained by the camera apparatus 10 can be increased.

Although the present embodiment has been described with respect to the case where the imaging section 2 includes elements such as the A/D converter, the image processing circuit, etc., these elements may be provided in the imaging control section 8. This allows the size of the imaging section 2 to be further reduced.

The size of the holding member 3 is determined according to the sizes of the rotation body mirror 1 and the imaging section 2.

In the camera apparatus 10 according to the present embodiment, the rotation body mirror 1 is formed to have a larger size than the imaging section 2 and the imaging section support portion 3*b* is formed so as to have a smaller size than the rotation body mirror support portion 3*a* for supporting the rotation body mirror 1. Moreover, the connecting portion 3*c* for connecting the imaging section support portion 3*b* with the rotation body mirror support portion 3*a* is shaped so as to have dimensions gradually increasing from the lower portion to the upper portion, i.e., along a left-right direction in FIG. 1B.

For example, in the camera apparatus 10 according to the present embodiment, the rotation body mirror 1 is formed using the hyperboloidal mirror shown in FIG. 3 and represented by the aforementioned expressions. In FIG. 3, when the rotation body mirror 1 is formed so as to have a diameter=62 mm and a height=15 mm, values of a, b, and c correspond to 13.70 mm, 9.1 mm, 16.45 mm, respectively, the imaging section 2 is formed so as to have a diameter=30 mm and a height=52 mm, and focal distance 2*c* (i.e., a distance between focuses ① and ②) is 32.9 mm, the length of the connecting portion 3*c* of the holding member 3 is from 100 mm to 120 mm, the width of the rotation body mirror support portion 3*a* of the holding member 3 is from 90 mm to 100 mm, and the width of the imaging section support portion 3*b* of the holding member 3 is from 30 mm to 50 mm.

Figure 4A:
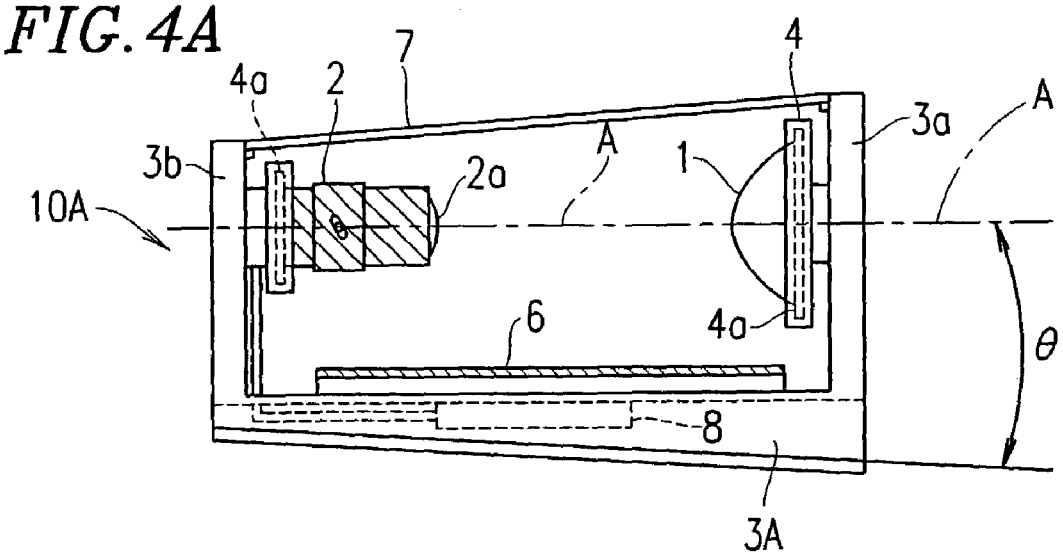
FIGS. 4A-4C are views for explaining another example of the camera apparatus shown in FIGS. 2A-2C.
Figure 4B:
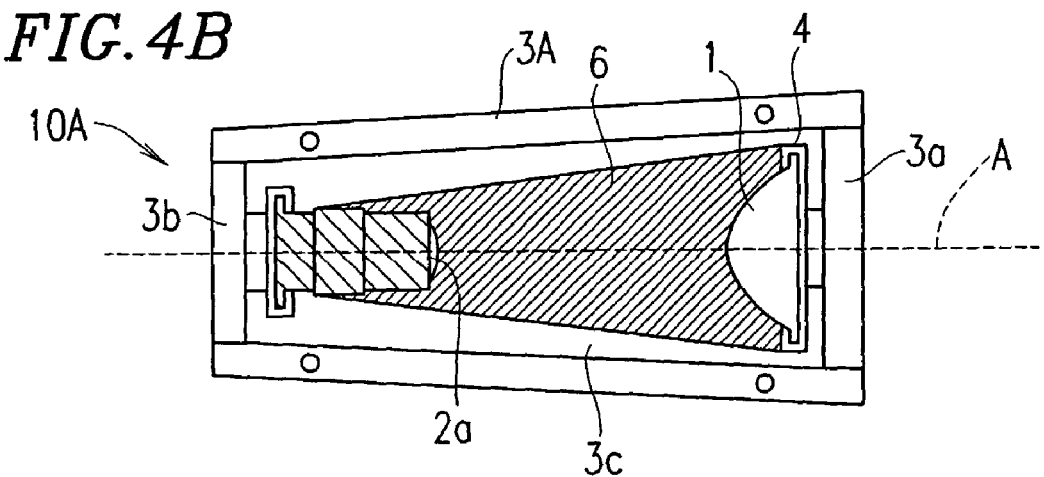
Figure 4C:
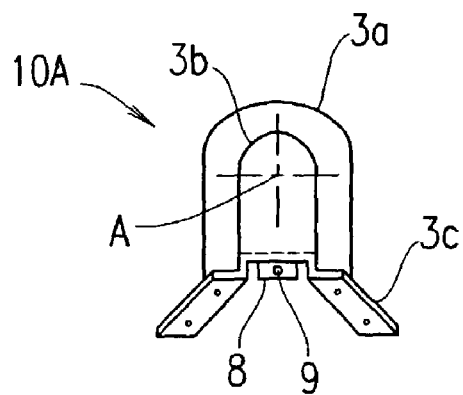

FIGS. 4A-4C are views for explaining another example of the camera apparatus 10 according to the present embodiment: FIG. 4A is a side view of a camera apparatus 10A viewed from a direction along a wall surface on which the camera apparatus 10A is installed; FIG. 4B is a side view of the camera apparatus 10A viewed from a direction perpendicular to the wall surface on which the camera apparatus 10A is installed; and FIG. 4C is an elevation view of the camera apparatus 10A viewed from a direction along central optical axis A of the camera apparatus 10A.

As a whole, the camera apparatus 10A shown in FIGS. 4A-4C is configured in the same manner as the camera apparatus 10 shown in FIGS. 2A-2C. However, the configuration of the camera apparatus 10A shown in FIGS. 4A-4C is different from that shown in FIGS. 2A-2C in that a connecting portion 3*c* of a holding member 3A has screw holes in peripheral portions thereof so that the holding member 3A can be installed directly on a wall surface or the like using screws. Other elements shown in FIGS. 4A-4C are the same as those shown in FIGS. 2A-2C and denoted by the same reference numerals as those shown in FIGS. 2A-2C. Therefore, detailed description of such elements will be omitted.

Next, a monitoring system for use with the camera apparatus 10 or 10A according to the present embodiment will be described (note that the monitoring system described below uses the camera apparatus 10).

Figure 5:
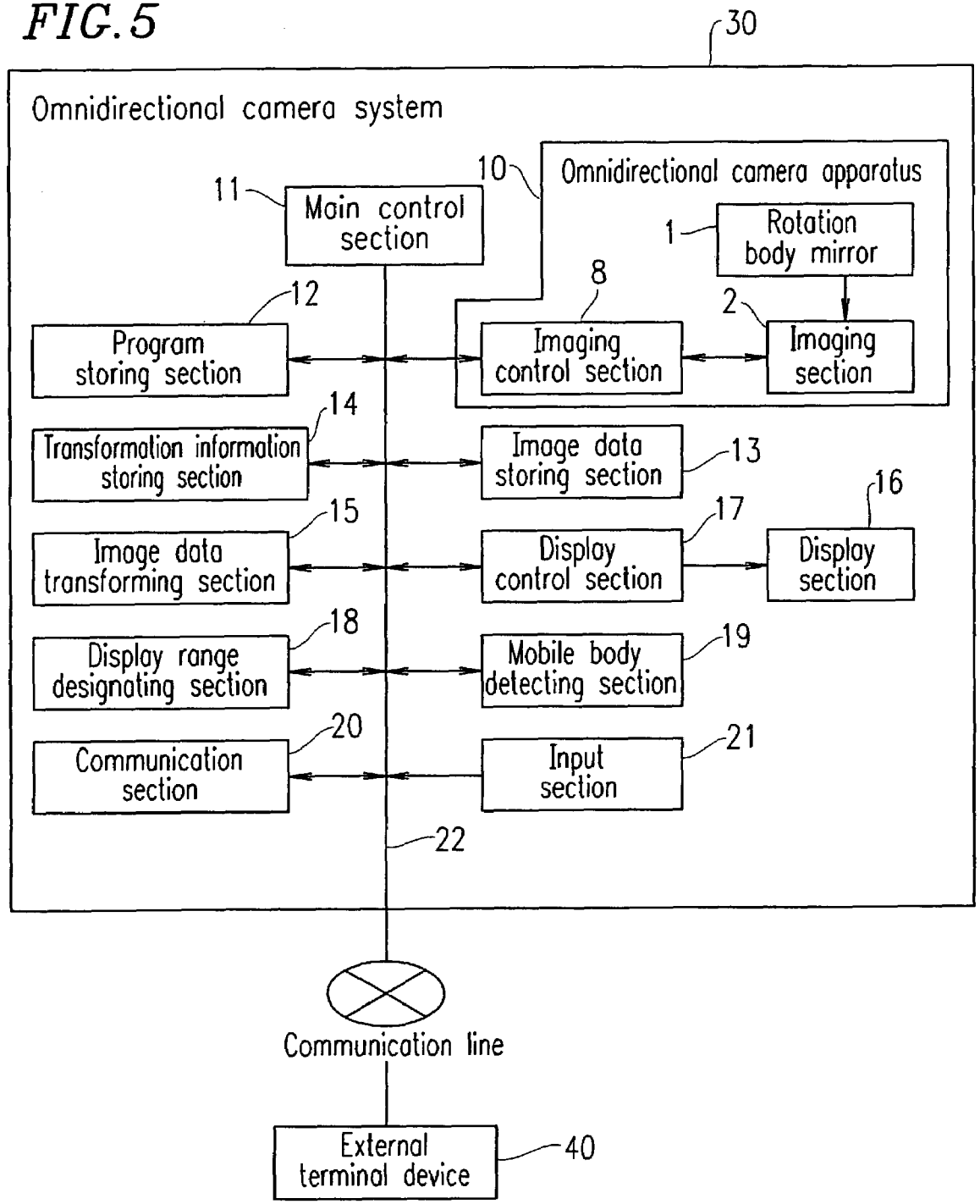
FIG. 5 is a block diagram showing a configuration of a monitoring system according to an embodiment of the present invention.

FIG. 5 is a block diagram showing a configuration of a monitoring system 30, which is an omnidirectional camera system, according to an embodiment of the present invention.

The monitoring system 30 includes: the camera apparatus 10 including the above-described elements, such as the rotation body mirror 1, the imaging section 2, and the imaging control section 8; a main control section 11 for controlling the camera apparatus 10 and the other elements of the monitoring system 30 described below; a program storing section 12 for storing a control program for controlling each element of the monitoring system 30; an image data storing section 13 for storing image data obtained by the camera apparatus 10; a transformation information storing section 14 for storing transformation information such as parameters or the like for use in transforming image data stored in the image data storing section 13 into a desired transformed image; an image data transforming section 15 for transforming image data stored in the image data storing section 13 into a desired transformed image; a display section 16 for displaying image data obtained by the camera apparatus 10 and a transformed image obtained by the image data transforming section 15; a display control section 17 for controlling the display section 16; a display range designating section 18 for designating the range of image data to be displayed on the display section 16; a mobile body detecting section 19 for detecting a mobile body moving within a view field area based on captured image data obtained by the camera apparatus 10; a communication section 20 for performing communication with an external device; an input section 21 for inputting a letter and instructing an application program; and a bus 22 for providing connections between elements.

Further, the monitoring system 30 is connected to a communication line via the bus 22. The communication line is connected to an external terminal device 40.

The main control section 11 includes, for example, a CPU, an MPU, or the like, in a computer and controls each element of the monitoring system 30 via the bus 22 based on the control program stored in the program storing section 12.

The program storing section 12 includes, for example, a RAM, an EPROM, an EEPROM, a flexible hard disk, a hard disk, or the like, and has a region for storing the control program for controlling each element, which is required by the main control section 11.

The image data storing section 13 includes, for example, a RAM, an EPROM, an EEPROM, a flexible hard disk, a hard disk, or the like, and sequentially updates and stores, in units of frames, image data obtained by the imaging section 2 of the camera device 10 under the control of the main control section 11.

The transformation information storing section 14 includes, for example, a RAM, an EPROM, an EEPROM, a flexible hard disk, a hard disk, or the like, and stores transformation information for use in transforming captured image data into image data in a predetermined display form.

The image data transforming section 15 stores, for example, an image data transformation program and transforms captured image data as input image data into image data in a specific display form, e.g., panoramic image data or perspective image data, based on transformation information stored in the transformation information storing section 14.

Figure 6:
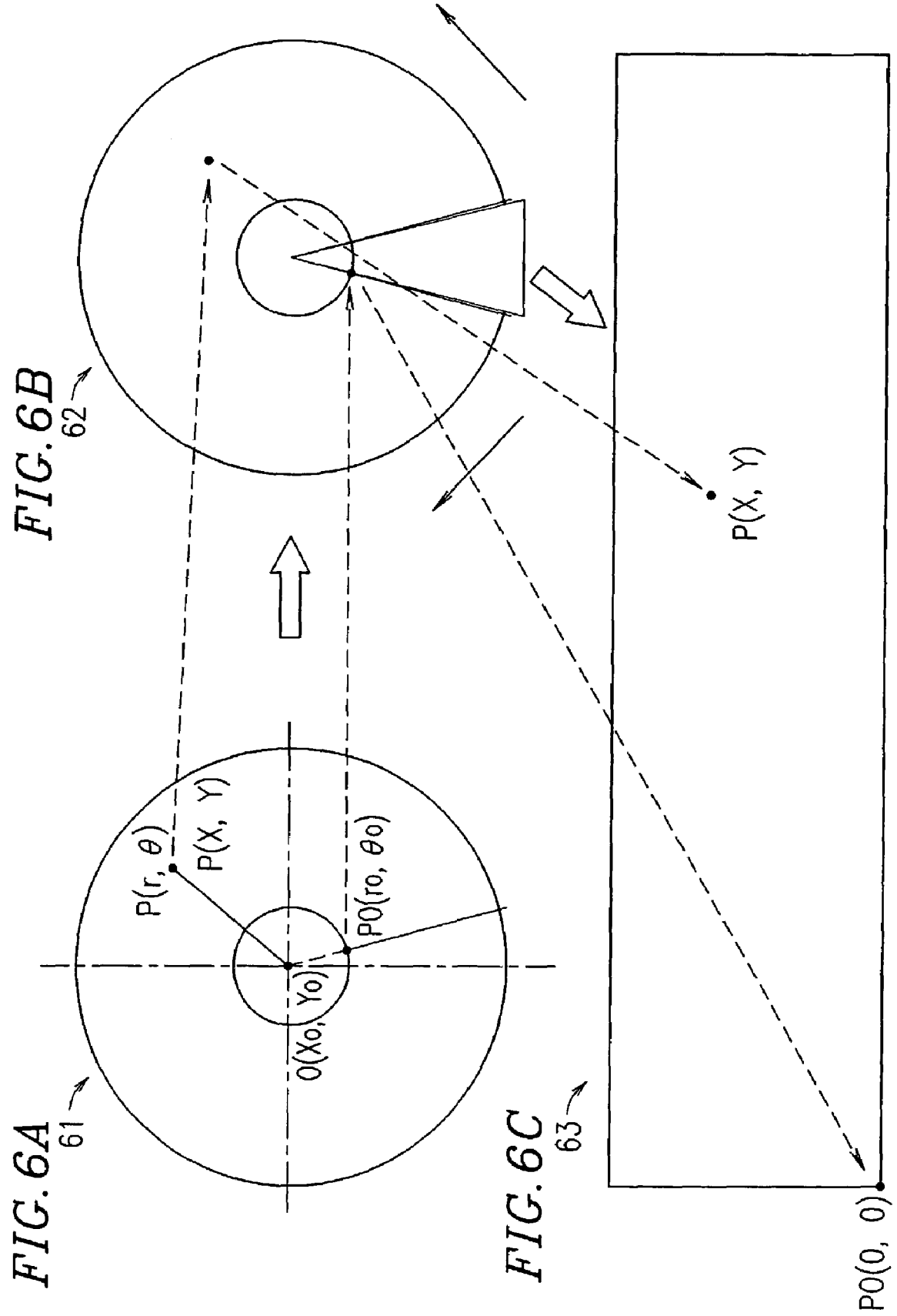
FIGS. 6A-6C are schematic diagrams for explaining a method for transforming image data obtained by a camera apparatus into a panoramic image.

FIGS. 6A-6C are schematic diagrams for explaining a method for transforming image data obtained by the camera apparatus 10 into a panoramic image: FIG. 6A shows image data 61 obtained by the camera apparatus 10; FIG. 6B shows image data 62 represented in the form of a ring which corresponds to the image data 61 being expanded by the image data transforming section 15 into the panoramic image based on the transformation information stored in the transformation information storing section 14; and FIG. 6C shows panoramic image data 63 represented in the form of a rectangle into which the ring-like image data 62 is transformed based on the transformation information stored in the transformation information storing section 14.

In FIG. 6A, point $P(r,\theta)$ denotes a picture element represented by polar coordinates on omnidirectional image data. In FIG. 6C, point $P(X,Y)$ indicates a picture element represented by XY coordinates. Point $P(X,Y)$ corresponds to point $P(r,\theta)$ represented by the polar coordinates, i.e., when the omnidirectional image data is transformed into a panoramic image, point $P(r,\theta)$ on the omnidirectional image data is transformed into point $P(X,Y)$ on the panoramic image. Moreover, point $P_0(r_0,\theta_0)$ denotes a reference point for expanding the omnidirectional image data into the panoramic image.

The omnidirectional image data obtained by the camera apparatus 10 represents a circular image and, in practice, it is difficult to obtain accurate visual information from such an image. Therefore, the display section 16 does not display the omnidirectional image data representing the circular image but displays a transformed image, such as a panoramic image, a perspective image, or the like, obtained by transforming the omnidirectional image data. A method for transforming the omnidirectional image data into panoramic image data or perspective image data has been known, and therefore detailed description thereof is omitted herein.

Data obtained by transforming the omnidirectional image data into the panoramic image or the perspective image is not limited to still image data. It is also possible to perform transformation processing to obtain dynamic image data.

The display section 16 includes an image display device such as a liquid crystal display (LCD), a plasma display(PD), or an electroluminescent display (ELD). The display section 16 displays, under the control of the display control section 17, omnidirectional image data or transformed image data such as panoramic or perspective image data obtained by transforming the omnidirectional image data.

The display range designating section 18 includes, for example, key switches, a touch panel formed in the display section 16, or the like, so as to designate a portion of image data displayed on the display section 16 as a display range. When the display range designating section 18 is used to designate the display range, the display control section 17 performs a control operation so as to enlarge and display a portion of the image data which corresponds to the designated display range.

Figure 7:
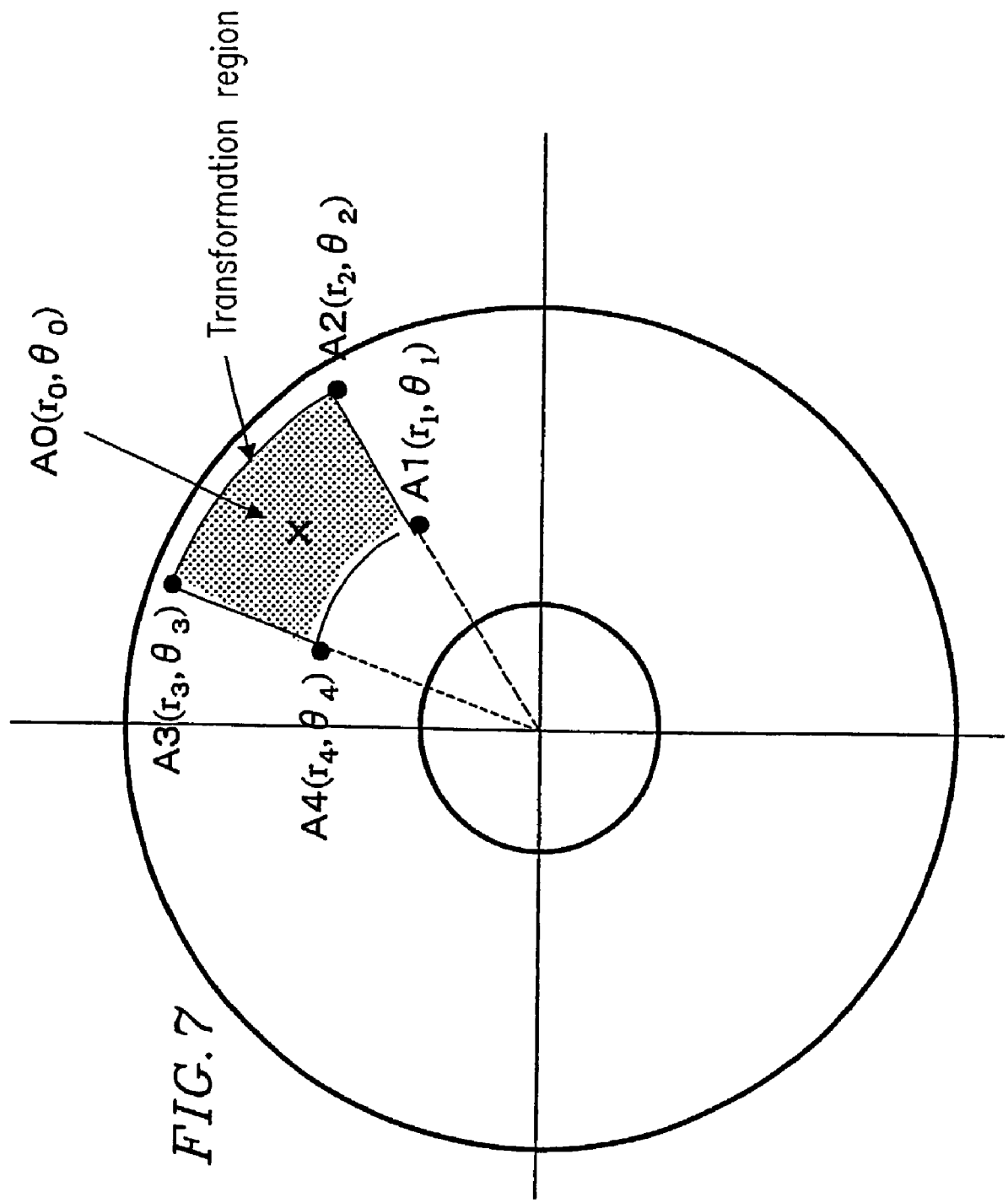
FIG. 7 is a schematic diagram for explaining a method for designating a display range with respect to omnidirectional image data obtained by an imaging section.

FIG. 7 is a schematic diagram for explaining a method for designating a display range with respect to omnidirectional image data obtained by the imaging section 2.

The circular image shown in FIG. 7 corresponds to input image data obtained via the imaging control section 8 and displayed on the display section 16. When a desired display range (a transformation region) is designated in the circular image displayed on the display section 16 using the display range designating section 18 or the input section 21, the image data transforming section 15 cuts image data in the designated display range out of circular image data and transforms that image data into perspective image data based on transformation information. As a result, the transformed perspective image data is displayed on the display section 16.

One method for designating a display range includes designating central coordinates $A_0(r_0, \theta_0)$ of a desired display range on a circular image and transforming image data in that predetermined display range including the central coordinates at the center into perspective image data, thereby designating the display range on the display section 16. In this case, r denotes a distance from the center of the circular input image and $\theta$ denotes an angle with respect to a reference position on the circular input image. By designating distance r and angle $\theta$, it is possible to designate position coordinates on the circular image.

Another method for designating a display range is to designate four specific points, e.g., $A_1(r_1,\theta_1)$, $A_2(r_2,\theta_2)$, $A_3(r_3,\theta_3)$, and $A_4(r_4,\theta_4)$, and designate, as the display range, a region enclosed by lines extending between these four points.

Alternatively, distance r may be preset so that only two angles are designated to designate the display range.

The mobile body detecting section 19 stores, for example, a mobile body detection program for detecting a mobile body. The mobile body detecting section 19 is configured to sequentially compare omnidirectional image data successively updated or stored in the image data storing section 13 in units of frames, so as to detect a mobile body approaching a region in the display range designated by the display range designating section 18, and follow movements of at least one or more mobile body based on image data indicating positional deviation of that detected mobile body.

The operation for detecting a mobile body approaching the display range will be described in further detail. When omnidirectional image data are successively stored in the image data storing section 13 in units of frames, the mobile body detecting section 19 performs a calculation with respect to the omnidirectional image data, so as to obtain a binarized image representing a difference between frames, and detects whether or not any mobile body is present based on the calculation result. When it is detected that a mobile body is present, data for that mobile body is registered in the image data storing section 13. Thereafter, registered difference data is sequentially updated so as to extract image data as the mobile body moves.

The display control section 17 is configured to display image data including an image of the mobile body detected by the mobile body detecting section 19 on the screen of the display section 16 in an enlarged or reduced manner.

The communication section 20 includes, for example, an antenna for transmitting a radio signal, a signal modulator-demodulator (a modem), a radio signal converter circuit, a communication line connecting circuit, etc., and is configured to transmit, under the control of the main control section 11, data for the image including the mobile body via a communication line to a previously designated external terminal device.

The input section 21 includes, for example, a ten-key pad, key switches, a touch panel, or the like, and is used for inputting a letter and providing an instruction to an application program.

In the monitoring system 30 according to the present embodiment having the above-described configuration, the camera apparatus 10 can obtain an image of a wide view field area, and thus it is not necessary to move the camera apparatus 10 so as to follow movements of a mobile body along directions of the movements of the mobile body. Accordingly, the mechanism of the camera apparatus 10 can be structured in a simple manner, and therefore it is possible to provide a monitoring system applicable for a wide variety of uses at a low cost.

Figure 8:
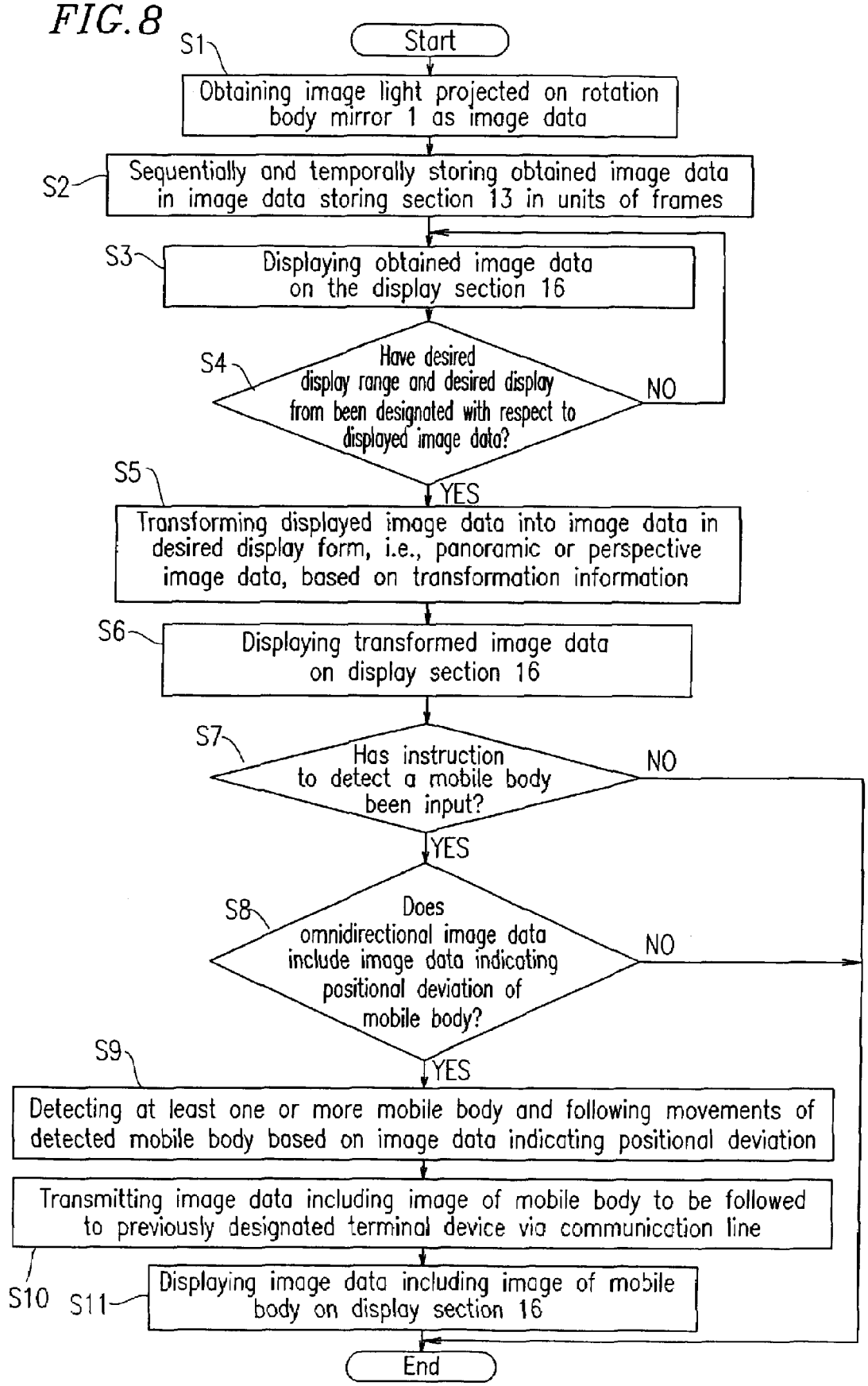
FIG. 8 is a flow chart for explaining an operation of a monitoring system according to an embodiment of the present invention.
Figure 9:
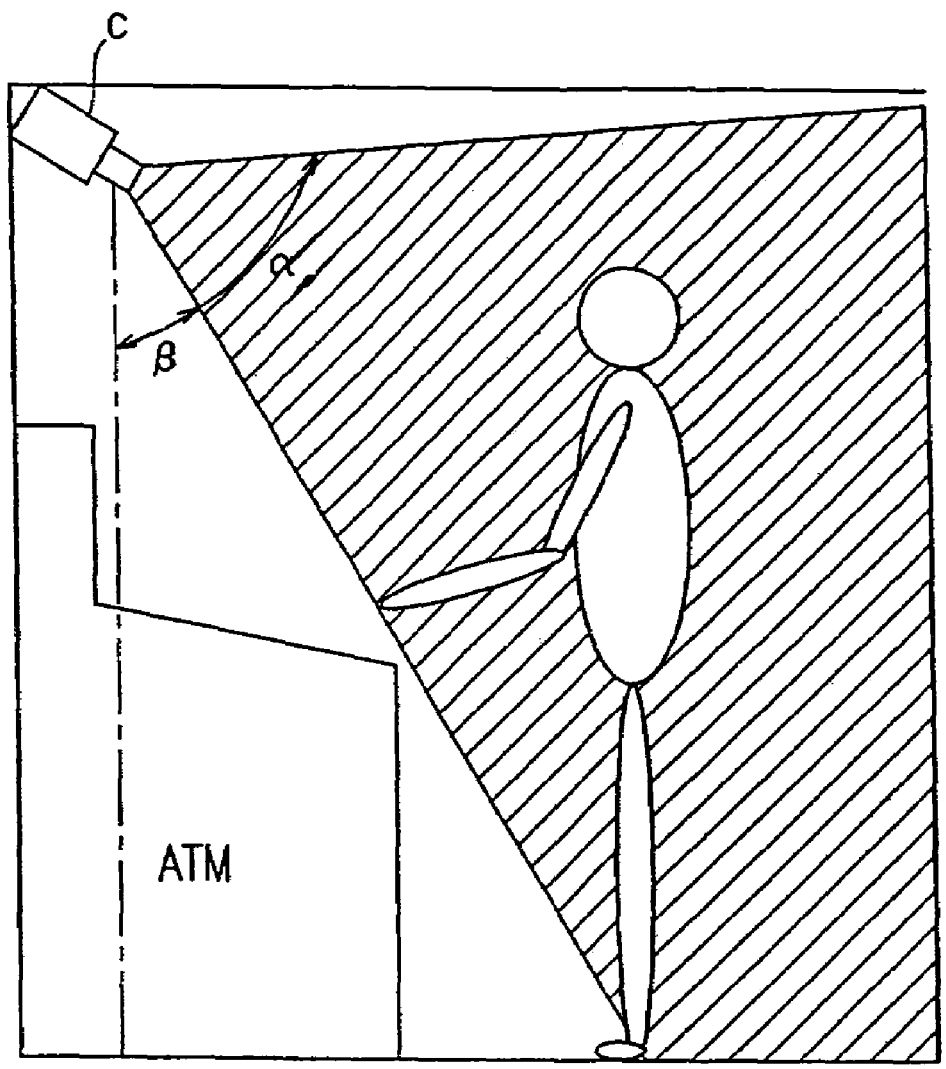
FIG. 9 is a side view showing an area monitored by an ITV camera normally used for monitoring an ATM, which is installed on a wall above the ATM so as to monitor an area ranging from a direction vertically downward from the ITV camera to a forward direction of the ATM.

Next, the operation of the monitoring system 30 according to the present embodiment will be described with reference to a flowchart shown in FIG. 8. In the following description, it is assumed that the camera apparatus 10 according to the present embodiment is installed on a wall surface in a closed area where an ATM is installed and the camera apparatus 10 obtains an image in an area ranging from a direction vertically downward from the camera apparatus 10 to a forward direction of the ATM.

Firstly, at step S1, the imaging section 2 of the camera apparatus 10 obtains image light projected on the rotation body mirror 1 as image data.

Next, at step S2, the image data obtained by the imaging section 2 of the camera apparatus 10 are sequentially and temporally stored in the image data storing section 13 in units of frames.

Next, at step S3, the image data obtained by the camera apparatus 10 and stored in the image data storing section 13 is displayed on the display section 16.

Next, at step S4, it is determined whether or not a desired display range and a desired display form have been designated by the display range designating section 18 or the input section 21 with respect to the image data displayed on the display screen 16. If it is determined that designation as desired has been performed, the process proceeds to step S5. If not, the process returns to step S3.

When it is determined that the display range and the desired display form have been designated as desired at step S4, at step S5, the image data transforming section 15 transforms the image data (a circular image) displayed on the display section 16 into image data in a desired display form, i.e., panoramic or perspective image data, based on transformation information stored in the transformation information storing section 14.

Next, at step S6, the transformed image data is displayed on the display section 16.

Next, at step S7, it is determined whether or not an instruction to detect a mobile body has been input via the input section 21. If it is determined that such an instruction has been input, the process proceeds to step S8. If not, the process ends.

Next, at step S8, it is determined whether or not omnidirectional image data includes image data indicating positional deviation of a mobile body. When the omnidirectional image data is determined to include such image data at step S8, the process proceeds to step S9, and if not, the process ends.

Next, at step 9, the mobile body detecting section 19 detects at least one or more mobile body and follows movements of that mobile body based on the image data indicating positional deviation of the mobile body. Herein, it is assumed that the mobile body detecting section 19 is configured to compare omnidirectional image data successively updated or stored in the image data storing section 13 in units of frames, so as to detect positional deviation of a mobile body in image data which is caused by movements of the mobile body, and to follow movements of at least one or more mobile body based on image data indicating the detected positional deviation.

Next, at step S10, the communication section 20 transmits, via a communication line, image data including an image of the mobile body to be followed to an external terminal device connected to the communication line.

Next, at step S11, the image data including the image of the mobile body is displayed on the display section 16.

By sequentially performing an operation including the above-described steps, it is possible to follow a mobile body an image of which is obtained by the camera apparatus 10, whereby it is ensured that a mobile body appears in the place where a monitoring system is installed.

Embodiments of the present invention have been described with respect to the case where the curved mirror is used as an optical system and the camera apparatus includes: the curved mirror 1 for reflecting image light representing an image of a wide view field area toward a prescribed direction; the imaging section 2 for obtaining, as an image, the image light reflected by the curved mirror 1; and a holding member for integrally holding the curved mirror 1 and the imaging section 2. However, the present invention is not limited to this, and the objectives of the present invention are also achieved in the case where a fish-eye lens is used as the optical system.

The present invention provides a camera device including: an optical system for projecting image light representing an image of a wide view field area toward a prescribed direction; an imaging section for obtaining, as an image, the image light projected by the optical system; and a holding member for integrally holding the optical system and the imaging section in a state where the curved mirror and the imaging section are opposed to each other.

The optical system is a curved mirror or a fish-eye lens.

The holding member is configured so as to be attachable while holding the curved mirror and the imaging section such that central optical axes of the curved mirror and the imaging section are inclined at a prescribed angle with respect to a vertical direction.

With this configuration, it is possible to hold the curved mirror and the imaging section in a fixed manner and reduce a blind area created within the widely ranging image area and, in particular, a blind area in a direction downward from the camera apparatus, when the camera apparatus is used in a monitoring system for monitoring a closed area.

Further, it is possible to eliminate adjustments of an installation angle during installation of the camera apparatus and it is also possible to realize a precise positional relationship between the curved mirror (convex mirror) and the imaging section.

Furthermore, it is possible to prevent generation of an image including a plurality of overlapping views due to light reflected within a transparent pipe or the like and it is also possible to enhance the quality of an image to be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A camera apparatus comprising:
   an optical system for projecting image light representing an image of a wide view field area toward a prescribed direction;
   an imaging section for obtaining, as an image, the image light projected by the optical system; and
   a holding member for integrally holding the optical system and the imaging section in a state where the optical system and the imaging section are opposed to each other, wherein the holding member is configured so as to be attachable while holding the optical system and the imaging section such that central optical axes of the optical system and the imaging section are inclined at a prescribed finite angle with respect to a vertical direction, wherein the holding member includes an optical system support portion for supporting the optical system, an imaging section support portion for supporting the imaging section, and a connection portion for connecting the optical system support portion and the imaging section support portion, and wherein the connection portion is positioned along a side of the holding member which is operable to be attached to a mounting surface.

2. The camera apparatus according to claim 1, wherein the optical system is a curved mirror or a fish-eye lens.

3. A camera apparatus according to claim 2, wherein the optical system support portion is a curved mirror support portion for supporting the curved mirror, the imaging section supporting portion is provided so as to be opposed to the curved mirror support portion, and the side of the holding member is an area which is not targeted for imaging by the curved mirror.

4. A camera apparatus according to claim 3, wherein the holding member includes the curved mirror support portion, the imaging section support portion, and the connecting portion so as to have a U-like shape when viewed from a direction along the central optical axis.

5. A camera apparatus according to claim 3, wherein the connecting portion of the holding member has a reflected light absorber formed thereon, the reflected light absorber absorbing light reflected by portions of the holding member.

6. A camera apparatus according to claim 5, further comprising a transparent cover attached to an end of each of the curved mirror support portion and the imaging section support portion, which are inclined to the holding member, so as to cover the curved mirror and the imaging section which are placed inside the holding member.

7. The camera apparatus according to claim 2, wherein the holding member holds the curved mirror and the imaging section so as to be opposed to each other such that their respective axial directions are identical.

8. A camera apparatus according to claim 2, wherein the curved mirror is a mirror having a shape of a body of rotation.

9. A camera apparatus according to claim 8, wherein the mirror having a shape of a body of rotation is provided in the form of a convex or concave paraboloid or hyperboloid.

10. A camera apparatus according to claim 2, wherein the holding member is attached to a wall surface of a construction such that a central optical axis of the imaging section is inclined at a prescribed finite angle with respect to the wall surface of the construction such that the holding member has a gap which is open upwards.

11. A camera apparatus according to claim 10, further comprising an attaching member for attaching the holding member to the wall surface of the construction.

12. A camera apparatus according to claim 2, wherein the holding member is attached to a ceiling surface of a construction such that the central optical axis of the imaging section is inclined at a prescribed finite angle with respect to the ceiling surface of the construction such that the holding member has a gap which is open upwards.

13. A camera apparatus according to claim 12, further comprising an attaching member for attaching the holding member to the ceiling surface of the construction.

14. The camera apparatus according to claim 2, wherein the imaging section includes an adjustment member for adjusting a distance between a specular surface of the curved mirror and a lens included in the imaging section.

15. A camera apparatus according to claim 2, wherein the holding member includes a fixing member for removably fixing each of the curved mirror and the imaging section.

16. A camera apparatus according to claim 2, further comprising an imaging control section for controlling the imaging section at a side of an area which is not targeted for imaging by the imaging section.

17. A camera apparatus according to claim 16, wherein the image control section is provided in the vicinity of the connecting portion of the holding member.

18. A monitoring system comprising:
a camera apparatus of claim 1;
an image data storage section for sequentially updating and storing image data obtained by the imaging section in units of frames;
a transformation information storing section for storing transformation information for use in transforming image data in a predetermined display form;
an image data transforming section for transforming image data obtained as input image data by the camera apparatus into transformed image data in the form of panoramic image data or perspective image data based on the transformation information;
a display section for displaying the transformed image data; and
a display control section for controlling displaying of image data on the display section.

19. A monitoring system according to claim 18, further comprising a display range designating section for designating a display range of the image data, wherein a portion of the image data, which corresponds to the display range designated by the display range designating section is displayed on the display section in an enlarged or reduced manner under the control of the display control section.

20. A monitoring system according to claim 19, further comprising a mobile body detecting section for comparing image data successively updated and stored in the image data storing section in units of frames so as to detect a mobile body approaching a region corresponding to the display range designated by the display range designating section, wherein image data including an image of the detected mobile body is displayed on the display section in an enlarged or reduced manner under the control of the display control section.

21. A monitoring system according to claim 20, further comprising a communication section for communicating with an external terminal device provided outside the monitoring system so as to transmit a variety of types of information to the external terminal device, wherein the communication section transmits image data including an image of a mobile body detected by the mobile body detecting section to the external terminal device.

22. The camera apparatus according to claim 1, wherein the holding member is attached to a wall surface of a construction such that a central optical axis of the imaging section is inclined at a prescribed finite angle with respect to the wall surface of the construction such that the holding member has a gap which is open upwards.

23. The camera apparatus according to claim 1, wherein the holding member is attached to a ceiling surface of a construction such that the central optical axis of the imaging section is inclined at a finite prescribed angle with respect to the ceiling surface of the construction such that the holding member has a gap which is open upwards.

24. The camera apparatus according to claim 1, further comprising an imaging control section for controlling the imaging section at a side of an area which is not targeted for imaging by the imaging section.

25. A camera apparatus according to claim 1, wherein
the holding member comprises a box-like structure having three side surfaces open and a fourth side operable to be attached to a surface.

26. A camera apparatus according to claim 25,
wherein a first side surface and a second side surface of the three side surfaces are opposite each other, and a third side surface of the three side surfaces is opposite the fourth side.

27. A camera apparatus according to claim 26, wherein the first and second side surfaces are substantially flat.

28. A camera apparatus according to claim 1,
wherein the optical system support portion has a surface on which the optical system is placed, the imaging section support portion has a surface on which the imaging section is placed, and said surface of the optical system support portion opposes said surface of the imaging section support portion.

29. A camera apparatus according to claim 28,
wherein the optical system support portion is configured so as to be displaced further from the mounting surface than the imaging section support portion when the camera apparatus is attached to the mounting surface.

30. A camera apparatus according to claim 1, wherein the connecting portion comprises an elongate, substantially flat member having a lower surface and opposite ends, wherein the imaging section support portion and the optical system support portion are respectively attached at, or proximally to, the opposite ends of said elongate, substantially flat member.

31. A camera apparatus according to claim 30, further comprising an attaching member for attaching the connecting portion to a flat surface of a construction such that the lower surface of the connecting portion is disposed against the flat surface of the construction along substantially all of its length.

32. A camera apparatus comprising:
an optical system for projecting image light representing an image of a wide view field area toward a prescribed direction;
an imaging section for obtaining, as an image, the image light projected by the optical system; and
a holding member for integrally holding the optical system and the imaging section in a state where the optical system and the imaging section are opposed to each other, wherein
the holding member is configured so as to be attachable while holding the optical system and the imaging section such that central optical axes of the optical system and the imaging section are inclined at a prescribed finite angle with respect to a mounting surface of a construction,
wherein the holding member includes an optical system support portion for supporting the optical system, an imaging section support portion for supporting the imaging section, and a connection portion for connecting the optical system support portion and the imaging section support portion, and
wherein the connection portion is positioned along a side of the holding member which is operable to be attached to the mounting surface.

* * * * *

UNITED STATES PATENT AND TRADEMARK OFFICE
CERTIFICATE OF CORRECTION

PATENT NO.         : 7,414,647 B2                              Page 1 of 1
APPLICATION NO. : 10/372053
DATED              : August 19, 2008
INVENTOR(S)        : Noritoshi Kakou et al.

It is certified that error appears in the above-identified patent and that said Letters Patent is hereby corrected as shown below:

Title Page; should read;

(73) Assignee:

Sharp Kabushiki Kaisha, Osaka (JP) and TOA Kabushiki Kaisha, Hyogo (JP)

Signed and Sealed this

First Day of December, 2009

David J. Kappos
*Director of the United States Patent and Trademark Office*